(12) United States Patent
Codilian et al.

(10) Patent No.: US 6,349,464 B1
(45) Date of Patent: Feb. 26, 2002

(54) METHOD OF MAKING A BALANCE-COMPENSATED ROTARY ACTUATOR BASED UPON TRACK-FOLLOW PERFORMANCE OF A ROTATABLE TEST HEAD STACK ASSEMBLY PORTION

(75) Inventors: Raffi Codilian, Irvine; Shawn E. Casey, San Jose, both of CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/584,837

(22) Filed: May 31, 2000

(51) Int. Cl.$^7$ ................................................ G11B 5/42
(52) U.S. Cl. ................................ 29/603.03; 360/97.03; 360/264.1; 360/264.2
(58) Field of Search .................... 29/603.03; 360/264.1, 360/264.2, 97.03, 97.01

(56) References Cited

U.S. PATENT DOCUMENTS

| | | |
|---|---|---|
| 4,772,974 A | 9/1988 | Moon et al. |
| 5,953,183 A * | 9/1999 | Butler et al. ............. 360/264.2 |

* cited by examiner

*Primary Examiner*—Carl E. Hall
(74) *Attorney, Agent, or Firm*—Milad G Shara (57) ABSTRACT

A method of making a balance-compensated (BC) rotary actuator for use in a rotatable BC head stack assembly (HSA) portion in a disk drive based upon track-follow characteristics of a rotatable test HSA portion is provided. The test HSA portion includes a test rotary actuator having a test actuator weight specification. The test rotary actuator has an actuator body portion, a test pivot axis extending through the actuator body portion and a head connected to the actuator body portion. The test rotary actuator is controlled to rotate about the test pivot axis for positioning the head over a selected disk track. The test rotary actuator has a test rotary actuator center-of-gravity torque vector associated therewith about the test pivot axis. The method provides for vibrating the disk drive at a vibration frequency in order to vibrate the test HSA portion. Position error information is read using the head while performing a track-follow operation during the vibrating of the test HSA portion. Head off-track error due to the vibration of the disk drive is derived based upon the read position error information representative of positioning of the head relative to the selected disk track. A resultant torque vector is derived based upon the head off-track error. The resultant torque vector has a magnitude equal to a mass of the test HSA portion times a distance between the test pivot axis and a test installed HSA portion center-of-gravity. The test installed HSA portion center-of-gravity takes into consideration forces acting upon the test rotary actuator due to installation with the test HSA portion. The resultant torque vector has a direction extending perpendicular from the test pivot axis towards the test installed HSA portion center-of-gravity. A balancing torque vector is derived having a magnitude equal to and a direction opposite of the resultant torque vector. The balancing torque vector is incorporated into the test actuator weight distribution specification to produce a BC actuator weight distribution specification. The BC actuator weight distribution specification is used to manufacture the BC rotary actuator having a BC pivot axis. The BC HSA portion has a BC HSA installation center-of-gravity at the BC pivot axis for mitigating external acceleration applied to the BC rotary actuator about the BC pivot axis due to external linear acceleration experienced by the disk drive during a track-follow operation.

18 Claims, 10 Drawing Sheets

Combined Signal

Fig. 9

FFT Power Spectral Density Plot

METHOD OF MAKING A BALANCE-COMPENSATED ROTARY ACTUATOR BASED UPON TRACK-FOLLOW PERFORMANCE OF A ROTATABLE TEST HEAD STACK ASSEMBLY PORTION

BACKGROUND OF THE INVENTION

1. Field of the Invention

The present invention relates generally to hard disk drives, and more particularly to a method of making a balance-compensated (BC) rotary actuator for use in a rotatable BC head stack assembly (HSA) portion in a disk drive based upon track-follow characteristics of a rotatable test HSA portion.

2. Description of the Prior Art

A representative disk drive incorporating the structures referred to herein is taught, for example, in U.S. Pat. No. 5,953,183 to Butler et al., entitled "HEAD STACK ASSEMBLY FOR A MAGNETIC DISK DRIVE WITH A PASS-THROUGH FLEX CIRCUIT CABLE," and is incorporated herein by reference.

A disk drive includes a disk having a track, a disk controller for generating a servo control signal, and a head stack assembly. The head stack assembly includes a rotary actuator and a flex cable assembly. The rotary actuator includes an actuator body portion, a pivot axis extending through the actuator body portion, and a head extending from the actuator body portion. The rotary actuator is responsive to the servo control signal for positioning the head over the track.

The flex cable assembly includes a flex circuit cable, a flex clamp and electrical components (e.g., an integrated circuit containing a pre-amplifier). The flex cable is interposed between a printed circuit board assembly and the integrated circuit. The head stack assembly includes a rotatable head stack assembly (HSA) portion which includes a rotatable flex cable portion for receiving the servo control signal and the rotary actuator. As such, the rotatable HSA portion includes those subcomponents of the head stack assembly which are configured to rotate about the pivot axis.

It is known that gravitational effects on a mass of the attached flex cable portion and other components of the head stack assembly produce a torque on the rotary actuator about an axis which extends perpendicularly from the pivot axis. Such a torque is undesirable as the rotary actuator becomes susceptible to an external acceleration torque being applied to the rotary actuator about the pivot axis when the disk drive is exposed to an external linear acceleration. The external linear acceleration may be due to vibration or shock for example. The resulting external acceleration torque results in positional errors of the heads relative to the desired tracks (off-track errors) being introduced into the system during operation.

Off-track errors are particularly undesirable for a number or reasons. In particular, such errors directly impact the overall seek time of the disk drive because the settling time will increase. Further, the data transfer rate will decease due to the off-track errors. Moreover, as the tracks per inch (TPI) specification of disk drives increase, the system sensitivity of such off-track errors likewise increases.

There have been attempts to mitigate against gravitational effects of the mass of the flex cable and other components which produce a torque applied to the rotary actuator. In this regard, a known methodology includes estimation of which portion of the flex cable is associated with a gravitational related torque applied to the rotary actuator related to the mass of the flex cable, in addition to the mass other components of the head stack assembly. For example, half of the flex cable may be a rough estimate. The prior art method would call for cutting the flex cable at the estimated location and removing the rotary actuator with the severed portion of the flex cable. The center of gravity of the rotary actuator with the severed portion of the flex cable would then be determined by mechanical means. Using such center of gravity information, the rotary actuator design would then be modified so as to attempt to locate the center of gravity of the rotary actuator with the severed portion of the flex cable at the pivot axis. Such prior art rotary actuator designs have proven to include a high degree of off-track errors associated with external linear acceleration acting on the disk drive. Accordingly, there is a need in the art for a method of making an improved rotary actuator as incorporated in a disk drive.

SUMMARY OF THE INVENTION

An aspect of the invention can be regarded a method of making a balance-compensated (BC) rotary actuator for use in a rotatable BC head stack assembly (HSA) portion in a disk drive based upon track-follow characteristics of a rotatable test HSA portion is provided by the present invention. The test HSA portion includes a test rotary actuator having a test actuator weight distribution specification. The test rotary actuator has an actuator body portion, a test pivot axis extending through the actuator body portion and a head connected to the actuator body portion. The test rotary actuator is controlled to rotate about the test pivot axis for positioning the head over a selected disk track. The test rotary actuator has a test rotary actuator center-of-gravity torque vector associated therewith about the test pivot axis. The method provides for vibrating the disk drive at a vibration frequency in order to vibrate the test HSA portion. Position error information is read using the head while performing a track-follow operation during the vibrating of the test HSA portion. Head off-track error due to the vibration of the disk drive is derived based upon the read position error information representative of positioning of the head relative to the selected disk track. A resultant torque vector is derived based upon the head off-track error. The resultant torque vector has a magnitude equal to a mass of the test HSA portion times a distance between the test pivot axis and a test installed HSA portion center-of-gravity. The test installed HSA portion center-of-gravity takes into consideration forces acting upon the test rotary actuator due to installation with the test HSA portion. The resultant torque vector has a direction extending perpendicular from the test pivot axis towards the test installed HSA portion center-of-gravity. A balancing torque vector is derived having a magnitude equal to and a direction opposite of the resultant torque vector. The balancing torque vector is incorporated into the test actuator weight distribution specification to produce a BC actuator weight distribution specification. The BC actuator weight distribution specification is used to manufacture the BC rotary actuator having a BC pivot axis. The BC HSA portion has a BC HSA installation center-of-gravity at the BC pivot axis for mitigating external acceleration applied to the BC rotary actuator about the BC pivot axis due to external linear acceleration experienced by the disk drive during a track-follow operation.

DESCRIPTION OF THE PREFERRED EMBODIMENTS

Referring now to the drawings wherein the showings are for purposes of illustrating preferred embodiments of the present invention only, and not for purposes of limiting the same, FIGS. 1–11 illustrate the method in accordance with the present invention.

Figure 1:
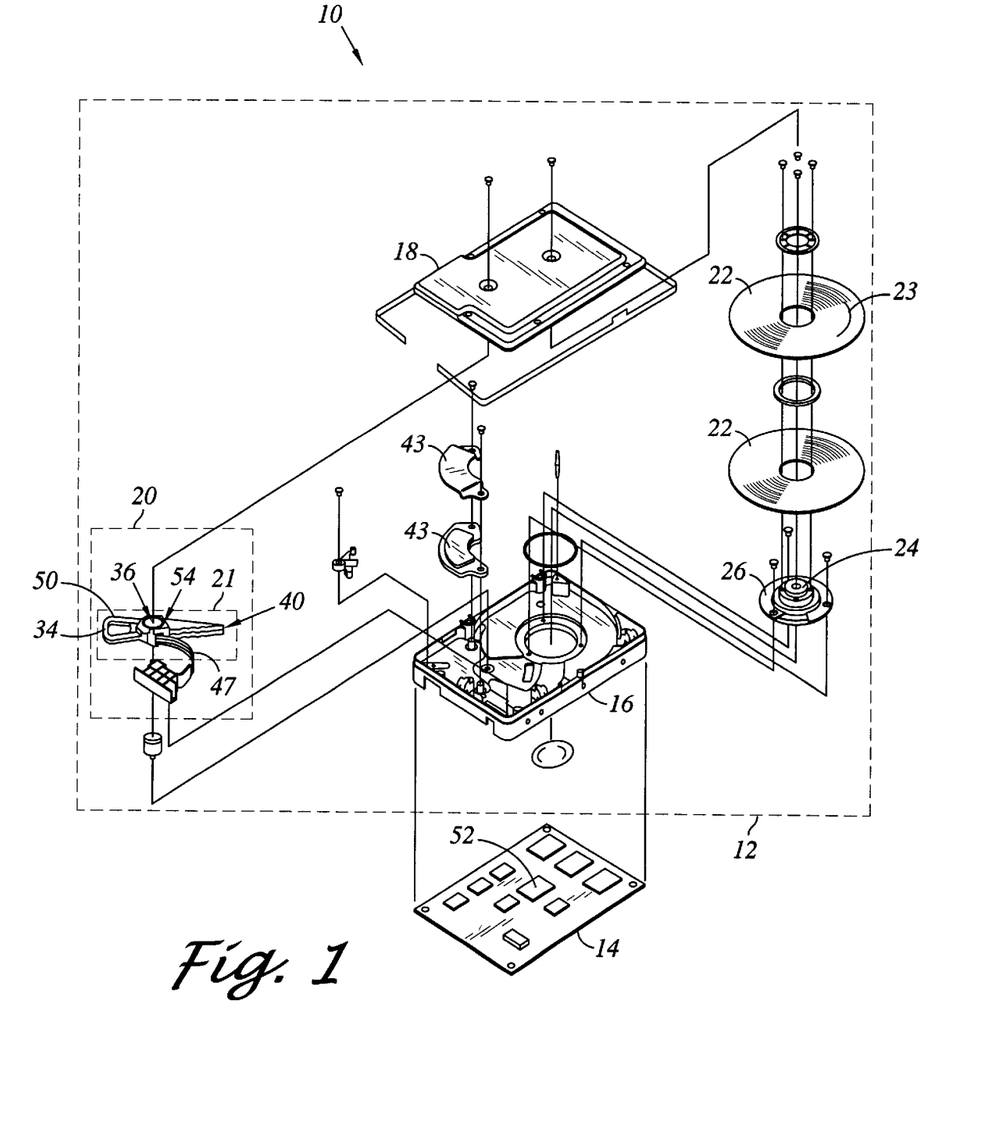
FIG. 1 is an exploded view of a disk drive including a rotatable balanced-compensated (BC) head stack assembly (HSA) portion having a BC rotary actuator as constructed in accordance with a method of the present invention.
Figure 2:
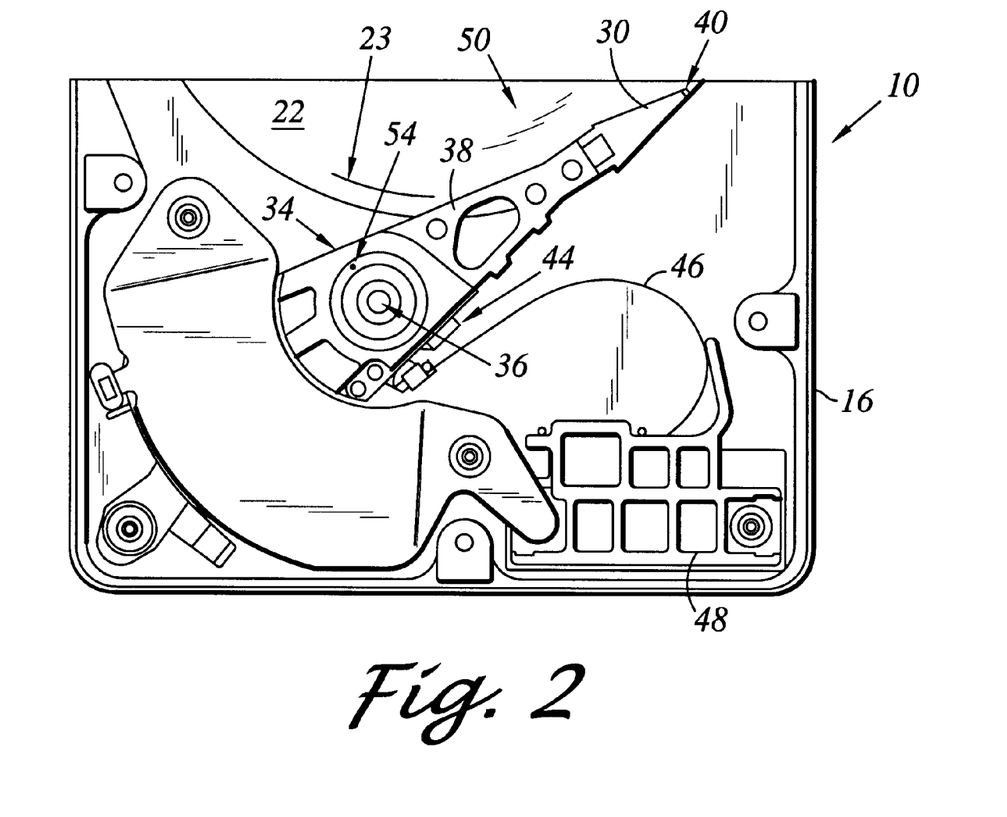
FIG. 2 is a partial top view of the disk drive of FIG. 1 as shown in assembled form with a partial view the rotatable BC HSA portion and the BC rotary actuator.
Figure 3:
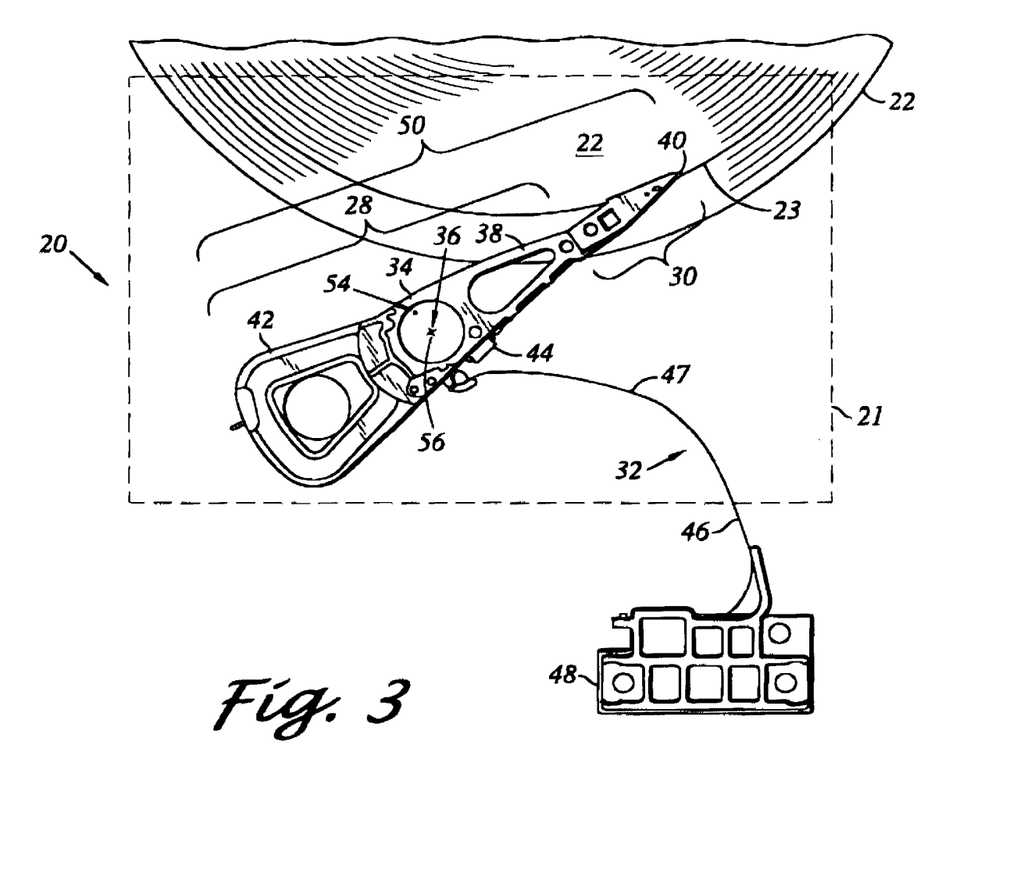
FIG. 3 is an enlarged top view of the rotatable BC HSA, including the rotatable BC HSA portion and the BC rotary actuator, as illustrated in FIG. 1.
Figures 6A, 6B:
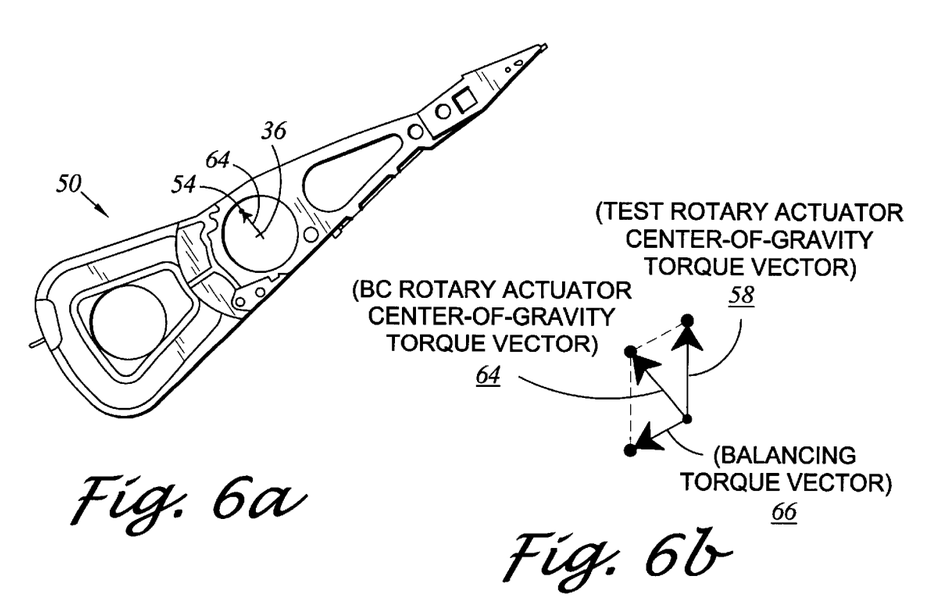
FIG. 6a is a top view of the BC rotary actuator of FIG. 3.
FIG. 6b is a vectorial depiction of the test rotary actuator center-of-gravity torque vector, BC rotary actuator center-of-gravity torque vector and balancing torque vector associated with the BC rotary actuator.
Figures 6C, 6D:
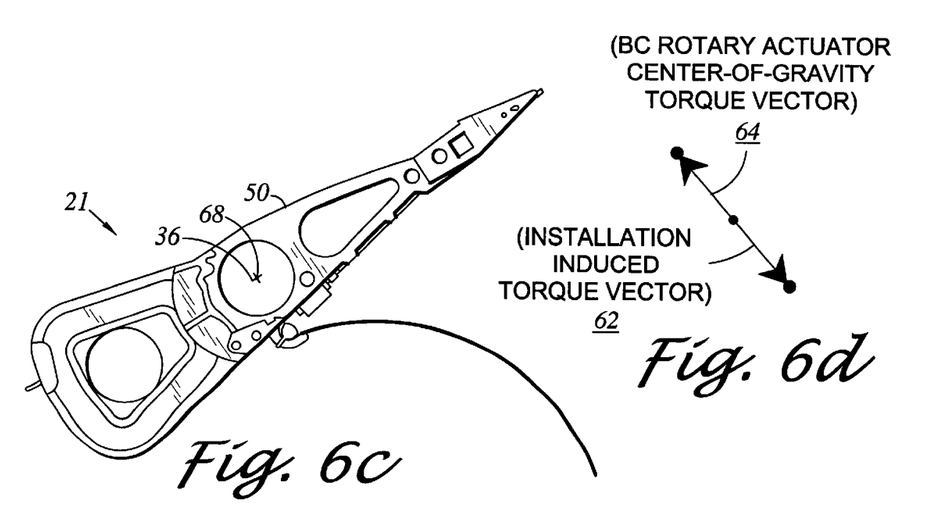
FIG. 6c is a top view of the rotatable BC HSA portion shown with the BC installed HSA portion center-of-gravity.
FIG. 6d is a vectorial depiction of the BC rotary actuator center-of-gravity torque vector and installation-induced torque vector associated with the rotatable BC HSA portion.

Referring now to FIGS. 1–3, as discussed in more detail below, there is provided a disk drive 10 including a disk 22 having a track 23, a disk controller 52 for generating a servo control signal, and a rotatable balance-compensated (BC) head stack assembly (HSA) portion 21. The BC HSA portion 21 includes a rotatable flex cable portion 47 for receiving the servo control signal and a balance-compensated (BC) rotary actuator 50. The BC rotary actuator 50 includes an actuator body portion 34, a pivot axis 36 extending through the actuator body portion 34, and a head 40 extending from the actuator body portion 34. It is contemplated that the present invention provides for a method of co-locating a BC installed HSA portion center-of-gravity 68 with the pivot axis 36, as shown in FIG. 6c as discussed in detail below. The rotatable flex cable portion 47 is connected to the actuator body portion 34 for providing the servo control signal to the BC rotary actuator 50. The BC rotary actuator 50 is responsive to the servo control signal for positioning the head 40 over the track 23. The present invention recognizes that the BC rotary actuator 50 is subject to an installation-induced torque vector about an axis extending perpendicular from the pivot axis 36 when the rotatable BC HSA portion 21 is connected in the disk drive 10.

Referring to FIG. 1, there is depicted the disk drive 10 which includes a head disk assembly 12 and a printed circuit board assembly 14. Generally, the printed circuit board assembly 14 includes circuitry for processing signals and controlling operations of the disk drive 10. The head disk assembly 12 includes a housing enclosure having a base 16 and a cover 18, a head stack assembly 20, and the magnetic disk 22 coaxially mounted in a stack upon a spindle 24 driven by a spindle motor 26 fixed to the base 16. As used herein, the term disk 22 denotes both the singular and the plural. In operation the spindle motor 26 rapidly rotates the disks 22 in a single direction about a disk axis of rotation. Each disk 22 has a disk surface. Data on the disks 22 are written in substantially parallel concentric tracks 23. As used herein, the term track 23 denotes both the singular and the plural. In addition, servo sectors are distributed about the disk surface for providing radial positional information in reference to the tracks 23 and the disk axis of rotation.

Referring now to FIG. 2, there is depicted a top view of the disk drive 10 of FIG. 1 as shown in assembled form with partial view the rotatable BC HSA portion 21 and the BC rotary actuator 50. Referring now to FIG. 3, there is depicted an enlarged view of the head stack assembly 20 of FIG. 1. The head stack assembly 20 comprises an actuator assembly 28, at least one head gimbal assembly 30 and a flex cable assembly 32. As used herein, the term head gimbal assembly 30, as well as its subcomponents thereof, denote both the singular and the plural. The actuator assembly 28 includes the actuator body portion 34 and the pivot axis 36. An actuator arm 38 extends from the body portion 38 to each disk 22 provided. As used herein the term actuator arm 38 denotes both the singular and the plural. A head gimbal assembly 30 extends from each of the actuator arms 38. Each head gimbal assembly 30 includes a load beam, a gimbal attached to the load beam, and an electromagnetic head 40 supported by the gimbal. As used herein the term head 40 denotes both the singular and the plural. The head gimbal assembly 30 is sized and configured to bias the head 40 toward the disk surface. In operation, the actuator assembly 28 is rotated to position the head 40 over the disk surface in a transducing relationship.

The actuator assembly 28 further includes a coil portion 42. The coil portion 42 extends from the actuator body portion 34 in an opposing direction from the head gimbal assemblies 30. The coil portion 42 interacts with a pair of permanent magnets 43 mounted the housing enclosure 16 to form a voice coil motor for rotating the actuator assembly 28 about the pivot axis 36. Thus, the voice coil motor controllably positions the head 40 relative to the disk surface. The printed circuit board assembly 14 is disposed in electrical communication with the head 40. Electrical connections extend from each of the heads 40 along the attached gimbals and load beams and commonly terminate at an integrated circuit 44 mounted to a side of the body portion 34 of the actuator assembly 28. The integrated circuit 44 includes apre-amplifier for increasing electrical signals sent to and received from the head 40. In addition, the integrated circuit 44 is disposed in electrical communication with the coil portion 42 for transmitting current thereto. The flex cable assembly 32 includes a flex cable 46, a flex clamp 48 and electrical components (e.g., the integrated circuit 44 containing a pre-amplifier). The flex cable 46 includes the flex cable portion 47. The flex cable 46 is interposed between the printed circuit board assembly 14 and the integrated circuit 44.

In operation, the printed circuit board assembly 14 which includes the disk controller 52 for generating a servo control signal which is transmitted to the integrated circuit 44 via the flex cable 46 which in turn is electrically communicated to the coil portion 42. As such, the actuator assembly 28 is rapidly pivoted in a back and forth motion about the pivot axis 36 so as to controllably position the heads 40 adjacent to the selected ones of the tracks on the disk surfaces in response to the servo control signal. Further the servo control data from servo sectors is read by the heads 40 to generate position error information (a position error signal) which is representative of the positioning of the heads 40 relative to particular tracks during a track-follow operation. Such electrical signal is transmitted to the integrated circuit 44 which in turn transmits a corresponding electrical signal to the printed circuit board assembly 14 via the flex cable 46. The printed circuit board assembly 14 receives the electrical signal and generates a signal which is representative of the read data read from the servo sectors. The printed circuit board assembly 14 uses the position error signal to control the movement of the actuator assembly 28.

The head stack assembly 20 includes the BC rotary actuator 50. The BC rotary actuator 50 has a BC actuator weight distribution specification which defines a BC rotary actuator center-of-gravity 54 as shown in FIG. 6a. As mentioned above, the rotatable BC HSA portion 21 includes the rotatable flex cable portion 47 and the BC rotary actuator 50. It is contemplated that the BC rotary actuator 50 is subject to the installation-induced torque vector 62 when the rotatable BC HSA portion 21 is connected in the disk drive 10. It is recognized that such installation-induced torque vector 62 is partially attributable to the attached flex cable 46 due to gravitational effects of a mass of the flex cable portion 47 and other components of the head stack assembly 20. It is further recognized that the installation-induced torque vector 62 may be partially due to flexure of the flex cable 46 and the interaction between the head gimbal assemblies 30 and the rotating disks 22.

Importantly, it is recognized that mitigation of the effects of the installation-induced torque vector 62 reduces external acceleration applied to the BC rotary actuator 50 about the pivot axis 36 due to external linear acceleration experienced by the disk drive 10 during a track-follow operation. As such, the BC rotary actuator center-of-gravity 54 of the BC rotary actuator 50 is displaced from the pivot axis 36 by a distance and a direction defined by the installation-induced torque vector 62 when the rotatable BC HSA portion 21 is connected in the disk drive 10 for mitigating external acceleration applied to the BC rotary actuator 50 about the pivot axis 36 due to external linear acceleration experienced by the disk drive 10 during a track-follow operation. The method of determining the location of the BC rotary actuator center-of-gravity 54 is discussed in detail below and generally includes a process of taking into account the installation-induced torque vector 62 by utilizing position error information.

Figure 4:
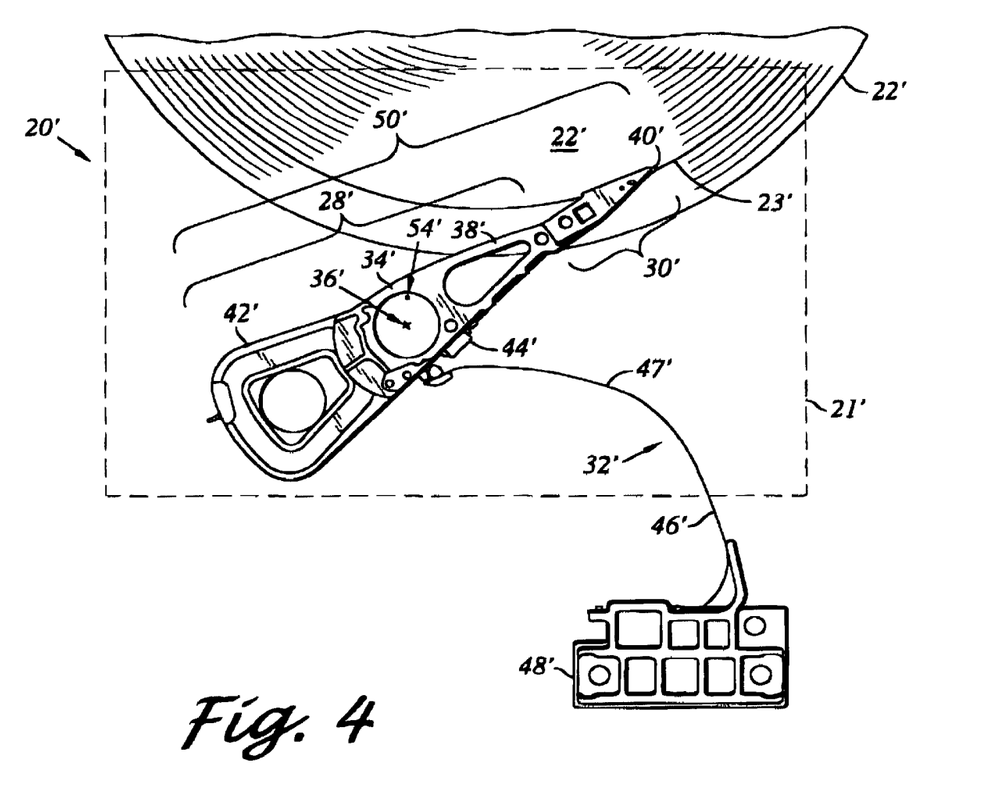
FIG. 4 is an enlarged top view of a rotatable test HSA, including a rotatable test HSA portion and a test rotary actuator, utilized to produce the rotatable BC HSA portion and the BC rotary actuator illustrated in FIG. 3.
Figure 5A:
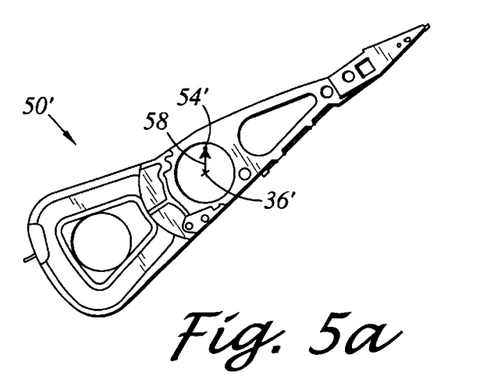
FIG. 5a is a top view of the test rotary actuator of FIG. 4.

Referring now to FIG. 4, there is depicted test HSA 20', including a test HSA portion 21' and a test rotary actuary 50'. The test HSA 20' comprises a test actuator assembly 28', and test head gimbal assembly 30' and a test flex cable assembly 32'. The test actuator assembly 28' includes a test actuator body portion 34' and a test pivot axis 36'. A test actuator arm 38' extends from the test body portion 38'. The test head gimbal assembly 30' includes a test head 40'. The test head gimbal assembly 30' is sized and configured to bias the test head 40' toward a test disk 22' so as to read data from a disk track, such as disk track 23'. The test actuator assembly 28' further includes a test coil portion 42'. The coil portion 42' extends from the test actuator body portion 34'. The test flex cable assembly 32' includes a test flex cable 46', a test flex clamp 48' and electrical components (e.g., test integrated circuit 44' containing a pre-amplifier). The test flex cable 46' includes the test flex cable portion 47'. As depicted in FIG. 5a, the test rotary actuator 50' has mass characteristics such its test rotary actuator center-of-gravity 54' is located away from the test pivot axis 36'. It is contemplated that the test rotary actuator 50' is based upon a test actuator weight distribution specification. As such, the test actuator weight distribution specification defines a test rotary actuator center-of-gravity 54' of the test rotary actuator 50'. The test rotary actuator 50' is configured to be integrated into a disk drive, such as disk drive 10 as otherwise depicted in FIG. 1.

Figure 5B:
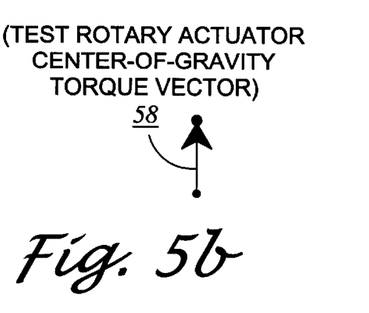
FIG. 5b is a vectorial depiction of the test rotary actuator center-of-gravity torque vector associated with the test rotary actuator.

It is contemplated that a test rotary actuator center-of-gravity torque vector 58 is associated with the test rotary actuator center-of-gravity 54' as symbolically depicted in FIG. 5a, and in the enlarged vectorial diagram of FIG. 5b. The test rotary actuator center-of-gravity torque vector 58 has a magnitude equal to the mass of the test rotary actuator 50' multiplied by the perpendicular distance from the test pivot axis 36' and a direction emanating from the test pivot axis 36' to the test rotary actuator center-of-gravity 54'.

According to an aspect of the method of the present invention, there is provided a method of making the BC rotary actuator 50 having reduced imbalance characteristics thereof based upon track-follow characteristics of the test HSA portion 21'. Referring now to the symbolic FIG. 7, the method initially provides for providing a test disk drive 70, having test rotary actuator 50' and test HSA portion 21', which is sized and configured similar to disk drive 10 with the BC rotary actuator 50 substituted by the test rotary actuator 50', and the BC HSA portion 21 by the test HSA portion 21'. The installed test rotary actuator 50' and test HSA portion 21' are configured to perform a track-follow operation while the attached disk drive 70 is vibrated at a vibration frequency of oscillation (w, in/sec) which may be controlled by a test computer 76. The test disk drive 70, and associated test rotary actuator 50' and test HSA portion 21', may be affixed to a shaker table 74 or other suitable laboratory controlled testing apparatus. By utilizing the feedback from a testing accelerometer 72 associated with the shaker table 74, a known sinusoidal vibration of known frequency and amplitude is generated. The shaker table 74 is configured to vibrate the attached test disk drive 70 linearly in positive and negative vibration directions (+Vib and −Vib) as controlled by a testing computer 76. Preferably, the input vibration takes the form of a predetermined input sinusoidal vibration (a periodic time signal f(t)) characterized by a period (T, in sec.) and a vibration magnitude or amplitude (VibG, in terms of G-level, such as 4g). The sinusoidal vibration frequency (w) is preferably chosen to be below the lowest of any resonance frequencies of the test rotary actuator 50' and associated components, such as the test HSA portion 21' (e.g., 100 Hz.).

Figure 9:
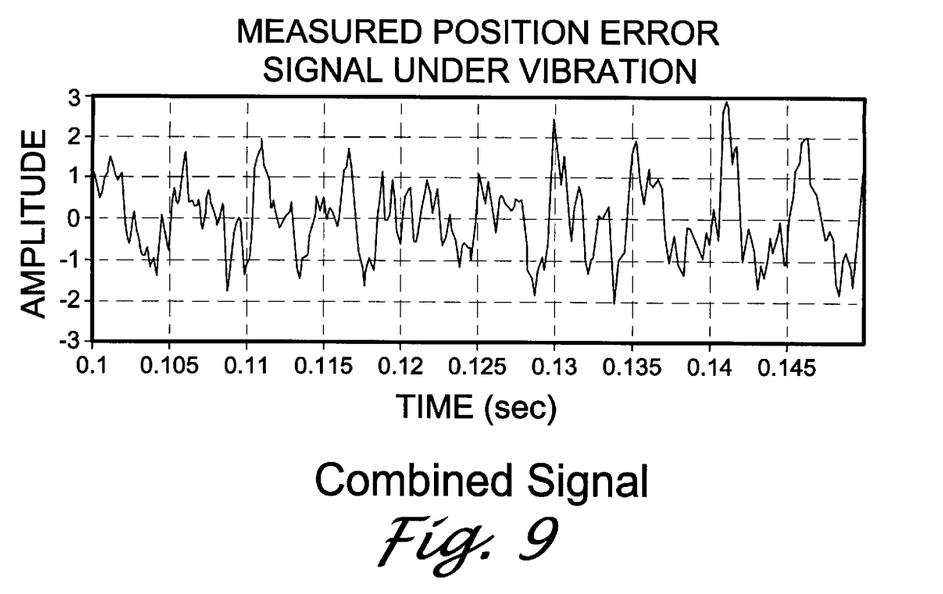
FIG. 9 is a sample depiction of the collected time domain data as utilized in an aspect of the method of the present invention.

Position error information in the form of a position error signal (PES) is read or otherwise collected by the test head 40' while the track-follow operation regarding a selected disk track 23' is performed while subjected to the vibrational input. FIG. 9 is a representative sample of such position error data. Such collected position error information is communicated to the testing computer 76 and is used to calculate a magnitude of head off-track error as further described below. In addition, position error due to acceleration while the track-follow operation is performed and while the test HSA portion 21' is subjected to the vibrational input is collected. Such collected acceleration data is communicated to the testing computer 76 and is used to determine a location of a BC rotary actuator center-of-gravity 54 as further described below.

Figure 7:
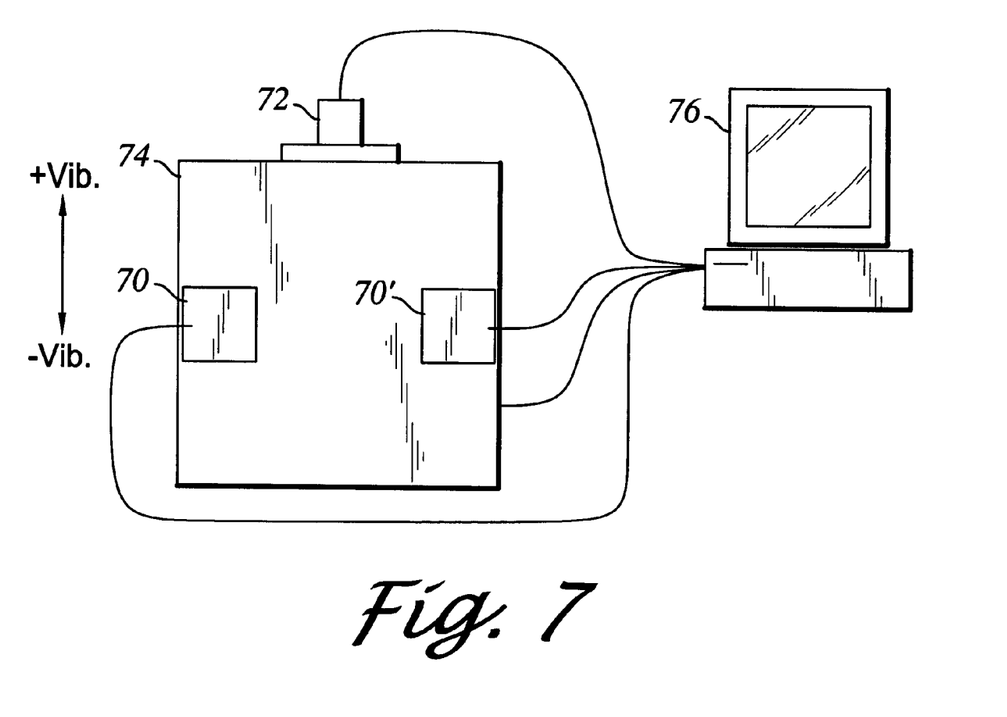
FIG. 7 is a depiction of a pair of test disk drives as shown with a shaker table utilized an aspect of the method of the present invention.
Figure 8:
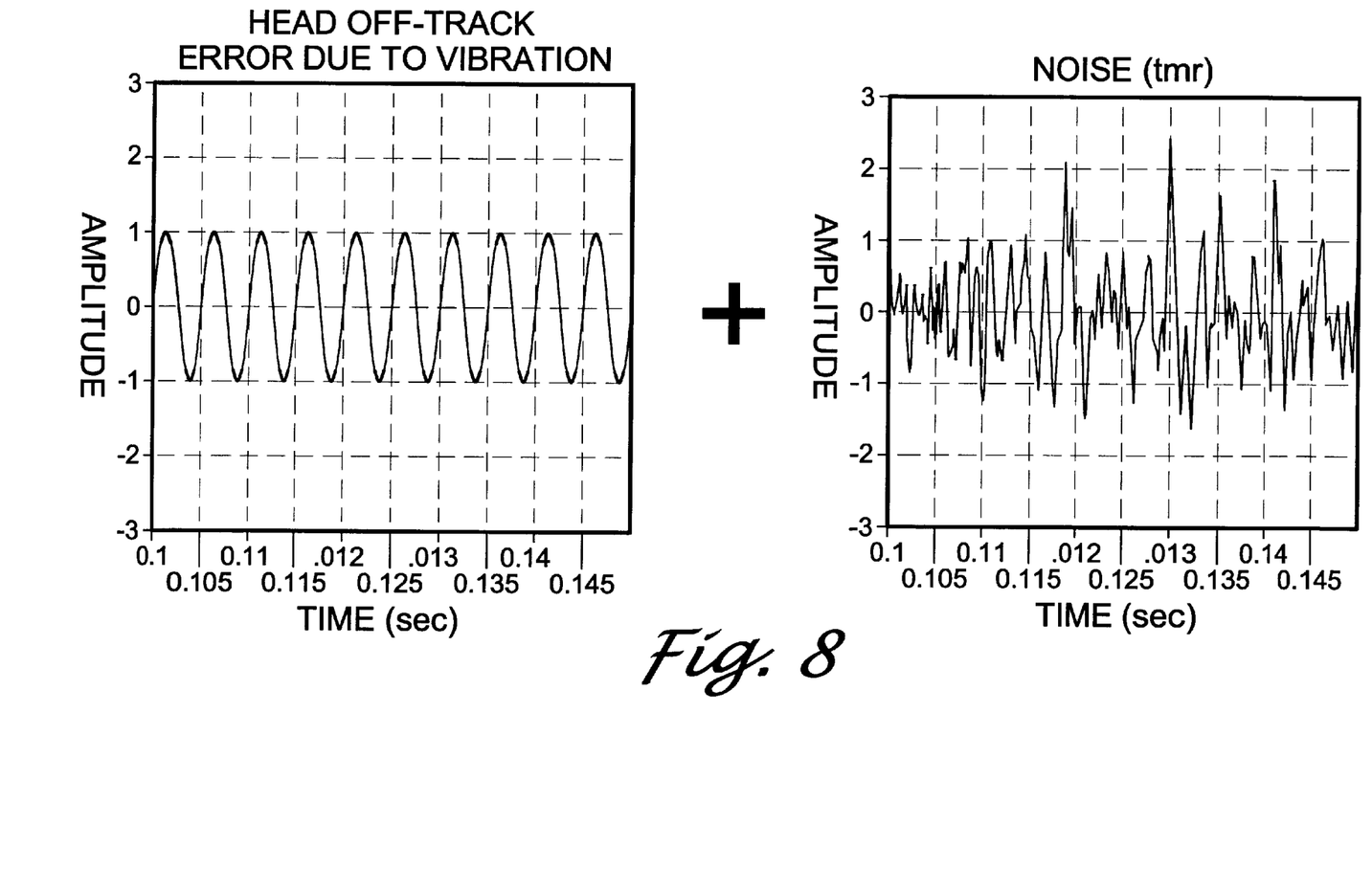
FIG. 8 depicts component parts of collected data, namely, a component representative of position error due to an input vibrational sinusoidal signal and a component representative of system noise, as utilized in an aspect of the method of the present invention.

In order to increase the sample size and accuracy of the data collected, the vibration and acceleration data may also be collected with regard to additional test disk drives having additional test rotary actuators, such as test disk drive 70', which is similarly configured as the test disk drive 70. Additionally, the forgoing vibrational testing is preferably repeated with the test disk drives 70, 70' being rotated by 90 degrees in the rotation plane of the test rotary actuator 50'.

Calculating Resultant Torque Vector from Read Position Error Information

Head off-track error due to vibration of the test disk drive 70 is determined from the read position error information representative of positioning of the test head 40' relative to the selected disk track 23'. Such position error information can then be used to calculate a magnitude of a resultant torque vector 60, as further discussed below. However, as one of ordinary skill in the art will appreciate, the determination of the head off-track error from the read position error information is challenging due to random noise signals introduced into the system. For example, referring to FIG. 9, there is depicted a representative sample of read position error information. It is contemplated that noise may be analytically filtered from such position error information to derive the head off-track error. Various methods of deriving the component associated with the head off-track error as discussed below. Thus, in FIG. 8 there is depicted component parts of the positional data, namely, a component representative of the head off-track error and a component representative of system noise. In the preferred embodiment of the present invention, the head off-track determination utilizes a Fast Fourier Transform (FFT) technique. Such FFT technique is used to recover the peak amplitude of the head off-track error.

FFT Technique for Determining Head Off-Track Error

In summary, as further discussed below, the Fast Fourier Transform (FFT) technique includes the following steps:

1. Transforming read position error information to frequency domain by applying a Fast Fourier Transform algorithm to obtain a power spectral density of the read position error information;
2. Calculating a peak amplitude of the head off-track error due to the vibration of the disk drive based upon an amplitude of the power spectral density at the predetermined frequency of the vibration of the disk drive 70; and
3. Converting the peak amplitude to a percent off-track;

The read position error information is time domain data. Such time domain data may be transformed into the frequency domain. For a periodic time signal f(t) with period (T) and frequency (w), its Fourier transform (FFT(w)) is defined as (1/T) multiplied by the integral from zero to T of $f(t)\,e^{-jwt}dt$. As one of ordinary skill in the art will appreciate, as a result of the integral, the absolute value of f(t) is the absolute value of the FFT(w) at peak frequency multiplied by a factor of two (2).

Figure 10:
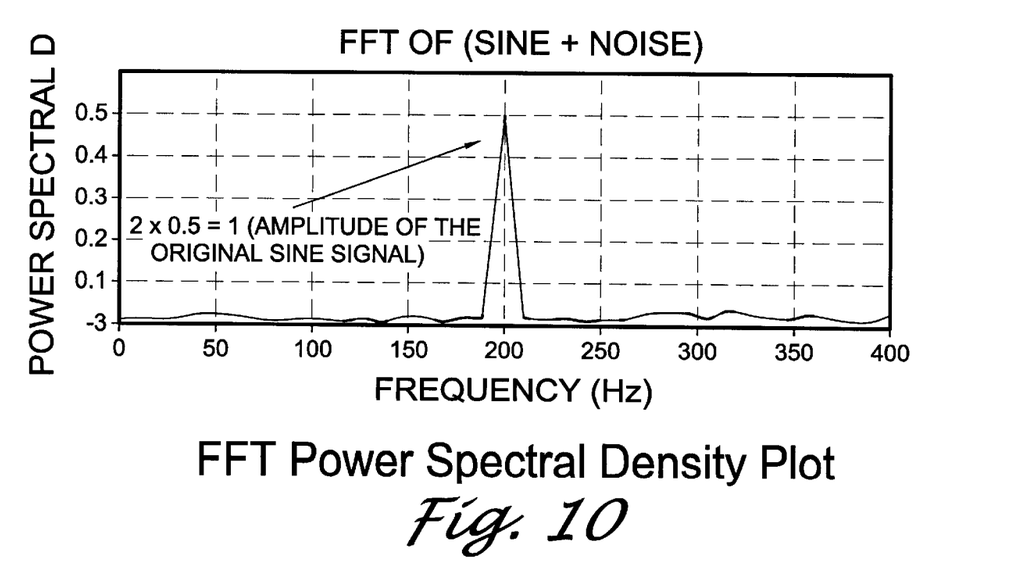
FIG. 10 is a sample power spectral density plot associated with the sample time domain data illustrated in FIG. 9 as utilized in an aspect of the method of the present invention.

Having transformed the time domain data to frequency domain data, a Fast Fourier Transform algorithm may be applied to the frequency domain data. Next, a power spectral density of the frequency domain data may be generated as a function of frequency. FIG. 10 is a sample depiction of the collected time domain data. FIG. 10 is a sample power spectral density plot associated with the sample time domain data illustrated in FIG. 9. Referring to the sample plot of FIG. 10, the peak of the power spectral density is depicted to occur at a frequency of 200 Hz. A vibration amplitude from the peak of the power spectral density may be determined at the predetermined input vibration frequency. The calculated vibration amplitude is converted to a percent off-track (vibration amplitude/track pitch×100%). It is further contemplated that other Fourier Transform techniques may similarly be applied, such as Discrete Fourier Transform (DFT) algorithms.

Iterative Rectified Signal Approach for Determining Head Off-Track Error

While the forgoing Fast Fourier Transform technique is a preferred embodiment of the method of the present invention, it is contemplated that other techniques and methods may be utilized to perform the off-track calculation. For example, the off-track calculation may follow an iterative rectified signal approach. Such approach begins with the initial step of rectifying the position error information due to vibration to produce a rectified position error information. The mean of the rectified position error information is determined. Then, the test disk drive 70 is used to perform a track-follow operation without vibrational input and baseline position error information is read. In this respect, such baseline position error information is representative of baseline noise of the system. The amplitude of a sinusoidal head off-track error due to a vibration of the disk drive 70 is guessed. A guessed sinusoidal signal is determined having the initially guessed amplitude and a frequency equal to the predetermined input frequency of vibration of the test disk drive 70. The guessed sinusoidal signal is added to the read position error information signal to produce a combined signal. The combined signal is rectified and a mean amplitude value is determined. This mean amplitude value is compared with the mean amplitude of the rectified read position error information. This process is continued interatively until the two mean amplitude values are the same, at which point the finally guessed amplitude as iteratively derived is contemplated to be correct. The finally determined vibration amplitude is then converted to a percent off-track (vibration amplitude/track pitch×100%).

Resultant Torque Vector Calculation from Head Off-Track Error

Figure 5C:
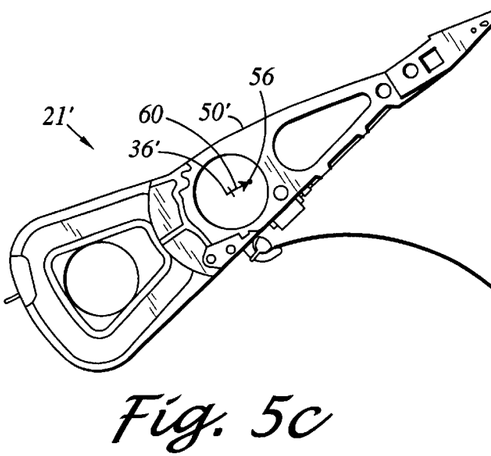
FIG. 5c is a top view of the rotatable test HSA portion shown with the test installed HSA center-of-gravity.
Figure 5D:
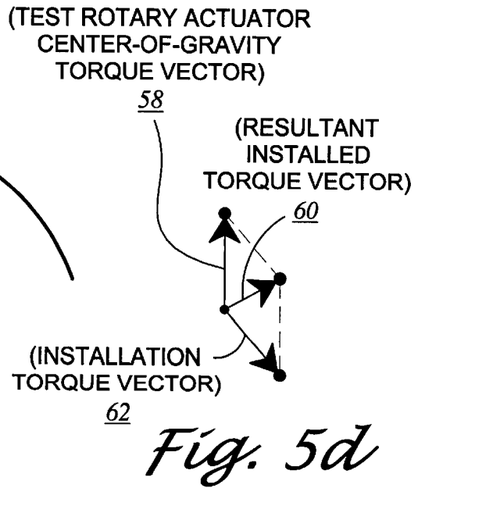
FIG. 5d is a vectorial depiction of the test rotary actuator center-of-gravity torque vector, installation-induced torque vector and resultant torque vector associated with the rotatable test HSA portion.

Having determined the head off-track error, in the form of a percent off-track, such as via the above-described techniques, the magnitude of the resultant torque vector 60, as depicted in FIGS. 5c and 5d, associated with the test rotary actuator 50' may be determined. It is understood that the magnitude of the resultant torque vector 60 is proportional to the percent off-track (%Off-Track) due to vibration with a certain amplitude and frequency. The relationship between the magnitude of resultant torque vector 60 and the %Off-Track may be derived from a vibration simulation model. As such, the magnitude of the resultant torque vector 60 (or "effective imbalance" (EI)) may be calculated according to the following equation:

$$EI = \%OT \times J / (100 \times R \times TPI \times VibG \times arej)$$

Where, J is the inertia of the test rotary actuator 50'; R is the radial distance between the test pivot axis 36' and the test head 40', TPI is the number of tracks per inch of the disk 22'; VibG is the vibration level or amplitude of the input vibration of the shaker table 74 (in terms of G-level); arej is an unit less acceleration rejection parameter which is a function of frequency and an acceleration rejection curve, as discussed below. Interestingly, the magnitude of the resultant torque vector 60 is proportional to the inertia of the test rotary actuator 50', and inversely proportional to the radial distance between the test pivot axis 36' and the test head 40', the number of tracks per linear distance, the vibration amplitude of the input vibration of the shaker table 74 and the acceleration rejection parameter.

Figure 11:
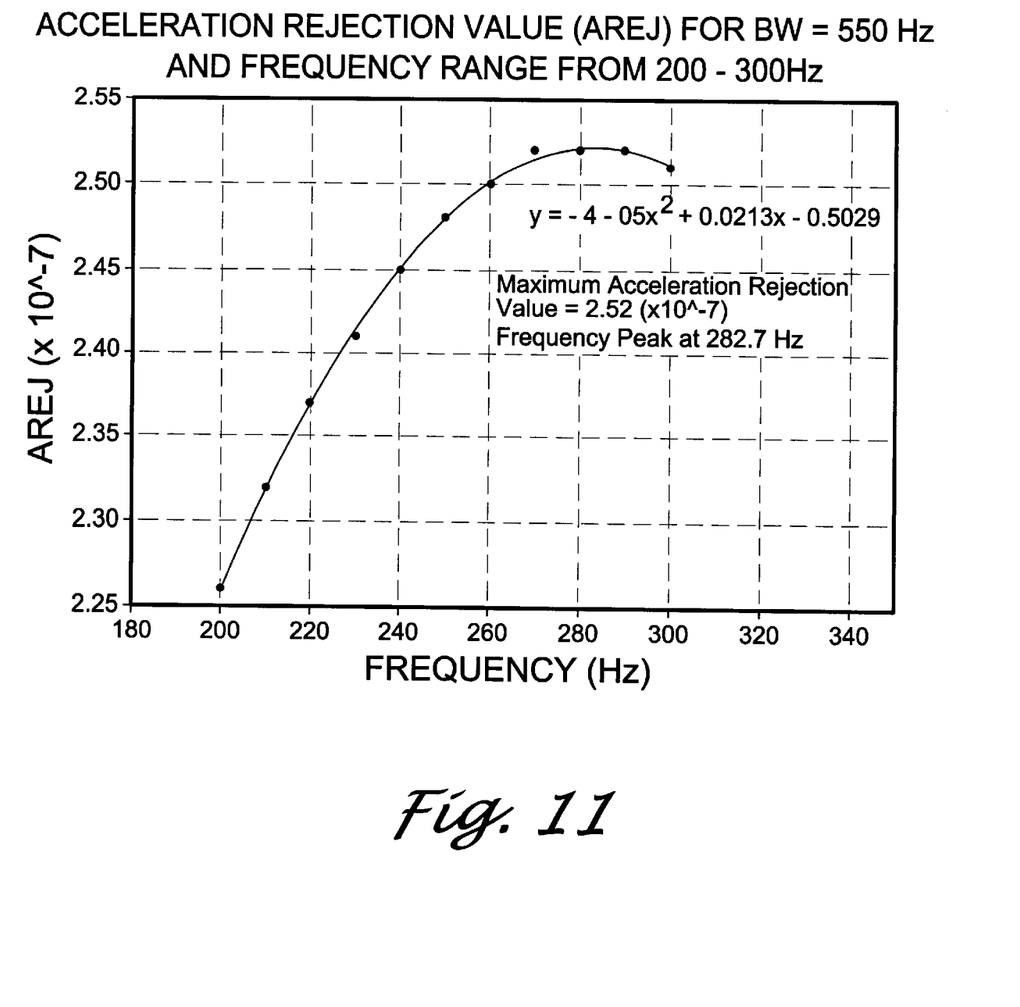
FIG. 11 is sample acceleration rejection curve as utilized in an aspect of the method of the present invention.

The acceleration rejection parameter (arej) is obtained from an acceleration rejection Bode plot at the vibration frequency. The acceleration rejection Bode plot is a plot of the magnitude ratio of the angular position of the test head 40' to the input disturbance torque (i.e., input from the servo motor) per unit inertia applied to the test rotary actuator 50' at different frequencies. The acceleration rejection curve is dependent on the bandwidth and system dynamics. The value corresponding to the predetermined vibration frequency is used in the equation. FIG. 11 is sample acceleration rejection curve. The following are samples of values of the variables used in the forgoing resultant installed torque vector magnitude calculation are as follows: %OT=3.99%; J=41.5×1.41612e$^{-5}$ (oz. in. sec$^2$); R=2.009 (inch); TPI= 14340; VibG=0.75(G); arej=2.26×10$^{-7}$ (at 200 Hz.). The calculated sample magnitude of the resultant installed torque vector 60 is 4.8×10$^{-3}$ oz.-in. or 0.346 gm.-cm.

Determining Test Installed HSA Portion Center-of-Gravity from Collected Vibrational Data Given a magnitude of the resultant installed torque vector 60, it is necessary to determine the location of the test installed HSA portion center-of-gravity 56 in order to know where to add or subtract mass in order to properly "balance" the design of the test rotary actuator 50'. In this regard, such "balancing" is to reduce the distance between the test installed HSA portion center-of-gravity 56 and the test pivot axis 36', with the ultimate goal of co-locating the two locations. As mentioned above, position error data is collected while the track-follow operation is preformed while the disk drive 70 subjected to the vibrational input. Such collected position error data is used to calculate a location of the test installed HSA portion center-of-gravity 56.

Based on saved plots from an oscilloscope, a phase relationship can be derived between the acceleration vibrational input to the shaker table 74 and a low-passed PWM position error output of the test disk drive 70. By using this phase relationship, two possible quadrants in which the effective imbalance could exist are determined with respect to a y-axis of vibration. The same test could be done for an x-axis. The overlapping of the possible quadrants (in a test disk drive 70 coordinate system) for the x and y direction vibration uniquely determines the quadrant where the effective imbalance resides. Thus, the location of the total effective imbalance and the test installed HSA portion center-of-gravity 56 in a test disk drive 70 coordinate system is uniquely determined.

The forgoing techniques are used to determine the coordinates of the test installed HSA portion center-of-gravity 56 resolved in a Cartesian coordinate system relative the test disk drive 70. However, because the test rotary actuator 50' rotates about the test pivot axis 36', the coordinates of the imbalance change as the test head 40' is positioned over varying disk track locations. In this regard, it is contemplated that the location of the test installed HSA portion center-of-gravity 56 must be converted to a coordinate system relative to the test rotary actuator 50', and more particularly to the test actuator weight distribution specification upon which the test rotary actuator 50' is modeled. It is contemplated that a transformation matrix may be utilized to convert the location of the test HSA portion installation center-of-gravity 56 to such test rotary actuator 50' coordinates.

Deriving Installation-Induced Torque Vector and Balancing Torque Vector

As described above, the magnitude of the resultant torque vector 60 is based upon the read position error information. By definition, the resultant torque vector 60 has a magnitude equal to a mass of the test rotary actuator 50' times a distance from the test pivot axis 36' to the test installed HSA portion center-of-gravity 56, and the resultant torque vector 60 has a direction emanating from the test pivot axis 36' towards the test installed HSA portion center-of-gravity 56. Referring now to the vectorial diagram of FIG. 5d, an installation-induced torque vector 62 may be derived through the vectorial subtraction of the resultant torque vector 60 from the test rotary actuator center-of-gravity torque vector 58.

Referring now to FIG. 6b, the method of the present invention further provides for deriving a balancing torque vector 66 based upon resultant torque vector 60 as derived above. The balancing torque vector 66 has a magnitude equal to and a direction opposite of the resultant torque vector 60. In this regard, the balancing torque vector 66 is based upon the position error information.

The vectorial addition of the balancing torque vector 66 with the test rotary actuator center-of-gravity torque vector 58 produces a BC rotary actuator center-of-gravity torque vector 64. It is contemplated that the magnitude of the BC rotary actuator center-of-gravity torque vector 64 is equal to the mass of the test rotary actuator 50' times a distance from the test pivot axis 36' to the BC rotary actuator center-of-gravity 54. In this regard, a BC rotary actuator 50 is constructed having mass characteristics such that its center-of-gravity is located at the determined BC rotary actuator center-of-gravity 54. Thus, the balancing torque vector 66 is incorporated into the test actuator weight distribution specification to produce a BC actuator weight distribution specification. The BC actuator weight distribution specification may be used to manufacture the BC rotary actuator 50 as shown in FIG. 6a. As such, the BC rotary actuator 50 has a pivot axis 36 and a BC rotary actuator center-of-gravity 54 displaced from the pivot axis 36. Such incorporation may be effectuated by any of those methods chosen from those which are well known to one of ordinary skill in the art. In this regard, as the BC actuator weight distribution specification will typically be designed with the aid of a computer model, such computer model may be modified to account for changes in the mass characteristics of the rotary actuator design so as to selectively add and subtract mass at various locations. In so doing, the location of the BC rotary actuator center-of-gravity 54 may be manipulated in comparison to the test rotary actuator design. As a consequence of such manipulation, the BC installed HSA portion center-of-gravity 68 is co-located with the pivot axis 36, as shown in FIG. 6c. The associated vectorial diagram is shown in FIG. 6d.

Advantageously, the forgoing method of making the BC rotary actuator 50 is nondestructive with regard to its utilization of the test rotary actuator 50' and test disk drive 70. This tends to reduce development time and cost of the BC rotary actuator 50 in comparison to those prior art methods which include physically cutting the flex cable. Additionally, the forgoing method of making the BC rotary actuator 50 uniquely adapted to compensate for the installation-induced torque vector as it incorporates feedback data in the form of actual testing positional error information. As such, all components of the installation-induced torque vector is compensated for not just those associated with the flex cable mass.

We claim:

1. A method of making a balance-compensated (BC) rotary actuator for use in a rotatable BC head stack assembly (HSA) portion in a disk drive based upon track-follow performance of a rotatable test HSA portion, the test HSA portion including a test rotary actuator having a test actuator weight distribution specification, the test rotary actuator having an actuator body portion, a test pivot axis extending through the actuator body portion and a head connected to the actuator body portion, the test rotary actuator being controlled to rotate about the test pivot axis for positioning the head over a selected disk track, the method comprising the steps of:

a) vibrating the disk drive at a vibration frequency in order to vibrate the test HSA portion;

b) reading position error information using the head while performing a track-follow operation during the vibrating of the test HSA portion;

c) determining head off-track error due to the vibration of the disk drive based upon the read position error information representative of positioning of the head relative to the selected disk track;

d) deriving a resultant torque vector based upon the determined head off-track error, the resultant installed torque vector having a magnitude equal to a mass of the test HSA portion times a distance between the test pivot axis and a test installed HSA portion center-of-gravity, the test installed HSA portion center-of-gravity taking into consideration forces acting upon the test rotary actuator due to installation with the test HSA portion, the resultant torque vector having a direction extending perpendicular from the test pivot axis towards the test installed HSA portion center-of-gravity;

e) deriving a balancing torque vector having a magnitude equal to and a direction opposite of the resultant torque vector;

f) producing a BC actuator weight distribution specification based upon the test actuator weight distribution specification and the balancing torque vector; and g) using the BC actuator weight distribution specification to manufacture the BC rotary actuator having a BC pivot axis, the BC HSA portion having a BC installed HSA center-of-gravity at the BC pivot axis for mitigating external acceleration applied to the BC rotary actuator about the BC pivot axis due to external linear acceleration experienced by the disk drive during a track-follow operation.

2. The method of claim 1 wherein the vibration frequency is lower than a lowest resonance frequency range of the test rotary actuator.

3. The method of claim 1 wherein the vibration of the disk drive is sinusoidal at a predetermined frequency, the head off-track error due to the vibration of the disk drive is sinusoidal, the determination of the head off-track error due to the sinusoidal vibration of the disk drive includes calculation of a peak amplitude.

4. The method of claim 3 wherein the calculation of the peak amplitude includes filtering noise data from the read position error information.

5. The method of claim 4 wherein the peak amplitude is calculated using Fast Fourier Transform techniques.

6. The method of claim 5 wherein step c) comprises the steps of:

i) transforming the read position error information to frequency domain by applying a digital Fast Fourier Transform algorithm to obtain a power spectral density of the read position error information;

ii) calculating the peak amplitude of the head off-track error due to the sinusoidal vibration of the disk drive based upon an amplitude of the power spectral density at the predetermined frequency of vibration of the disk drive; and iii) converting the peak amplitude to a percent off-track.

7. The method of claim 1 wherein the head off-track error is calculated using Fast Fourier Transform techniques.

8. The method of claim 1 wherein the head off-track error is calculated using discrete Fourier Transform techniques.

9. The method of claim 1 wherein the head off-track error is calculated using iterative rectified signal techniques.

10. The method of claim 1 wherein a percent off-track is determined from the head off-track error, the magnitude of the resultant installed torque vector is calculated as a proportional function of the percent off-track.

11. The method of claim 1 wherein the test rotary actuator has a static test rotary actuator inertia, the magnitude of the resultant installed torque vector is calculated as a proportional function of the static test rotary actuator inertia.

12. The method of claim 1 wherein the magnitude of the resultant torque vector is calculated as an inversely proportional function of a radial distance between the test pivot axis and the head.

13. The method of claim 1 wherein the magnitude of the resultant torque vector is calculated as an inversely proportional function of a number of disk tracker per linear distance.

14. The method of claim 1 wherein the vibration of the disk drive is sinusoidal with a predetermined amplitude, the magnitude of the resultant torque vector is calculated as an inversely proportional function of predetermined amplitude.

15. The method of claim 1 wherein the magnitude of the resultant torque vector is calculated as an inversely proportional function of an acceleration rejection parameter.

16. The method of claim 15 wherein the vibration of the disk drive is sinusoidal at a predetermined frequency, the acceleration rejection parameter is determined from an acceleration rejection Bode plot at the predetermined frequency.

17. The method of claim 16 wherein the acceleration rejection Bode plot is a plot of a magnitude ratio of angular position of the test rotary actuator to a disturbance torque per unit inertia applied to the test rotary actuator at different frequencies.

18. A balance-compensated rotary actuator designed in accordance with the method of claim 1.

* * * * *